No. 880,122. PATENTED FEB. 25, 1908.
G. M. BUCEY.
WHEEL.
APPLICATION FILED APR. 13, 1907.
2 SHEETS—SHEET 1.
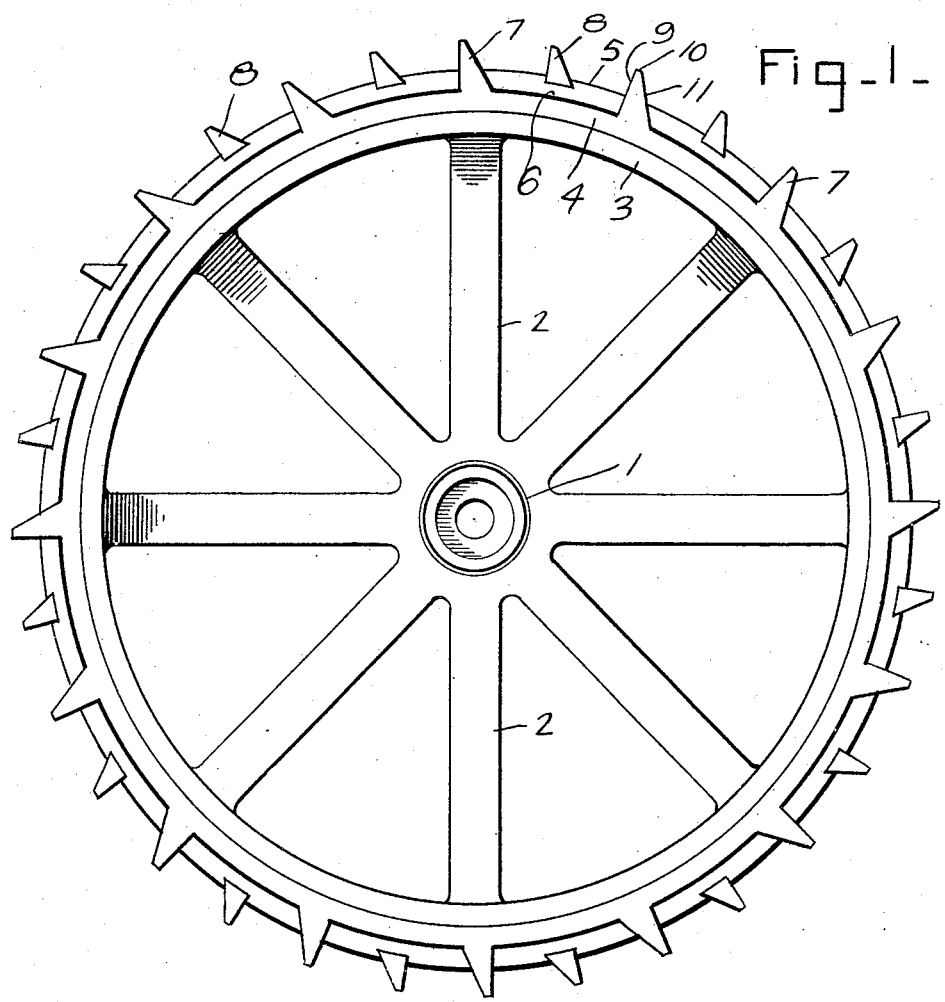
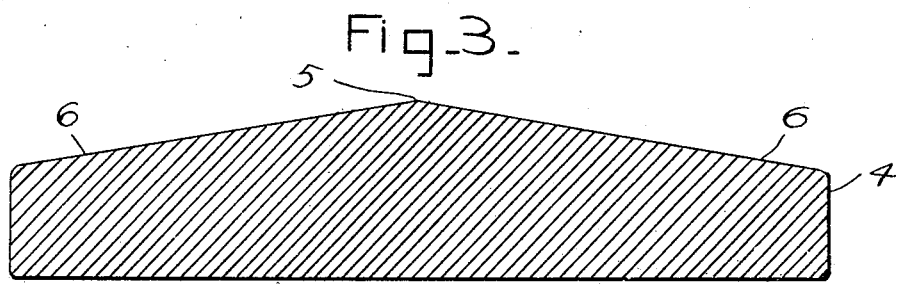

No. 880,122. PATENTED FEB. 25, 1908.
G. M. BUCEY.
WHEEL.
APPLICATION FILED APR. 13, 1907.

2 SHEETS—SHEET 2.

Witnesses
Inventor
George M. Bucey

UNITED STATES PATENT OFFICE.

GEORGE M. BUCEY, OF EAST SPRINGFIELD, OHIO.

WHEEL.

No. 880,122.      Specification of Letters Patent.      Patented Feb. 25, 1908.

Application filed April 13, 1907. Serial No. 368,013.

*To all whom it may concern:*

Be it known that I, GEORGE M. BUCEY, a citizen of the United States, residing at East Springfield, in the county of Jefferson, State of Ohio, have invented certain new and useful Improvements in Wheels; and I do hereby declare the following to be a full, clear, and exact description of the invention, such as will enable others skilled in the art to which it appertains to make and use the same.

This invention relates to new and useful improvements in wheels, and it has particular reference to a wheel for use in connection with traction engines or heavy agricultural machines. The wheel comprehended in the present invention is of that type which are formed with an irregular tread surface to insure a more efficacious grip upon soft or muddy roads or muck or boggy lands.

In connection with a wheel of the above type the invention has for its object to provide a tread surface of novel construction and contour and in connection with which are employed projecting teeth or spurs of novel construction and arrangement.

Figure 2:
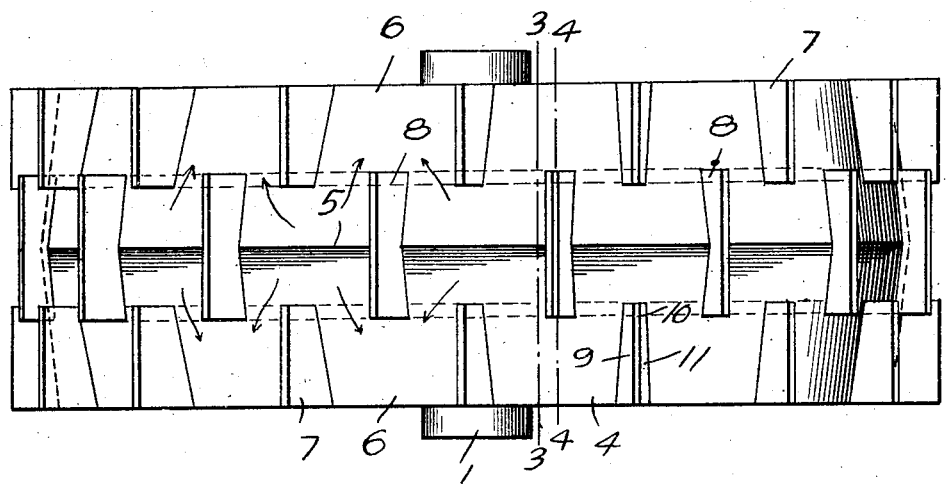
Figure 4:
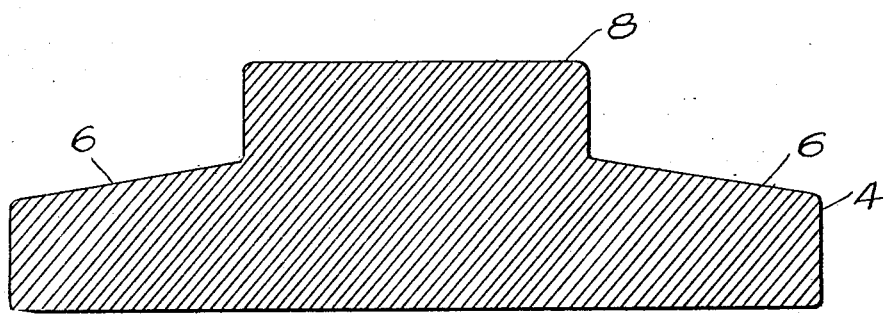

The details of construction will appear in the course of the following description in which reference is had to the accompanying drawings forming a part of this specification, like characters of reference designating similar parts throughout the several views, wherein:

Figure 1 is a side elevation of a wheel constructed in accordance with the present invention. Fig. 2 is a plan view thereof. Fig. 3 is a fragmentary transverse section of the tire on the line 3—3 of Fig. 2, and Fig. 4 is a similar section on the line 4—4 of Fig. 2.

Referring specifically to the accompanying drawings, there is shown a wheel having the usual hub 1, spokes 2, felly 3 and tire 4, which may or may not be as is desired, an integral part of the felly. As shown the tire 4 is mounted on the felly in the usual manner and is constructed to form the gripping tread of the wheel. With this object in view, said tire has a centrally located peripheral rib 5, the surfaces of the tire between its sides and said rib being inclined or tapered, as at 5.

By reference to Fig. 2, it will be noted that on the inclined surfaces 6 are provided a plurality of spaced equi-distant correspondingly arranged projecting teeth or spurs 7, the inner ends of which terminate short of the rib 5, and the outer ends of which are flush with the ends of the tire 4. Between the teeth 7 are provided similarly constructed teeth 8, which intersect the central rib 5 and which have their ends projected slightly into the spaces between the several teeth 7, as indicated by the dotted lines in Fig. 2. The teeth 7 and 8 are similarly constructed and as shown in Fig. 1 are formed with a perpendicular front face 9, a blunt gripping edge 10 and an inclined rear face 11, which tapers outwardly with respect to the face 9. By virtue of this arrangement, a more efficacious grip is insured when the teeth sink into the muck, bog, or sand of the soft roads.

The action of the teeth is materially facilitated by virtue of the arrangement above detailed. It will be noted that the staggered relation in which they are disposed affords a tortuous passage therebetween which is continuous throughout the length of the tread and, in action, the soft earth will be forced or pressed from the spaces between the teeth 8 into the spaces between the teeth 7, as indicated by the arrows in Fig. 2, and owing to the inclination of the surfaces 6 the material thus forced into the spaces between the teeth 7 will be continuously forced out of said spaces beyond the sides of the wheel. This staggered arrangement of the parts also prevents any of the soft earth from hardening upon the tread and clogging the spaces between the teeth to retard the action of the wheel, and this advantage is augmented by the partially overlying relation of the teeth 7 and 8, whereby no interstices occur between the end faces of said teeth.

It is proposed to make the teeth of sufficient proportions that their blunt edges 10 will project to the harder bed portion of the road and will frictionally grip or take into the same, without allowing the wheel to sink any material distance, although of course in this last contingency the action of the tread surface will be the same.

A wheel constructed in accordance with the present invention is exceedingly simple in construction, inexpensive to manufacture, and practical and efficient in use.

From the foregoing description, it will be seen that simple and efficient means are provided for accomplishing the objects of the invention, but, while the elements herein shown and described are well adapted to serve the functions set forth, it is obvious that various minor changes may be made in the proportions, shape and arrangement of the several parts without departing from the spirit and scope of the invention as defined in the appended claims.

What is claimed is:

1. A wheel of the type set forth having its tread formed with a centrally located peripheral rib and with two series of teeth, one series of teeth having their inner ends terminating short of said rib, and the other series of teeth intersecting said rib and arranged in staggered relation to the first-named series of teeth.

2. A wheel of the type set forth having its tread formed with a centrally located peripheral rib having inclined sides, and with two separate series of teeth, the teeth of one series terminating short of said rib and the teeth of the other series intersecting said rib and arranged in staggered relation to the first-named series of teeth, said last-named series of teeth having their ends disposed partially in the space between the first-named series of teeth, to afford a continuous tortuous passage.

In testimony whereof, I affix my signature, in presence of two witnesses.

GEORGE M. BUCEY.

Witnesses:
 OSCAR WAGNER,
 G. W. WILSON.